US005839180A

United States Patent [19]

Hochmiller

[11] Patent Number: 5,839,180

[45] Date of Patent: Nov. 24, 1998

[54] STUD INSTALLER FOR WHEEL STUDS

[75] Inventor: John E. Hochmiller, Hudson, Colo.

[73] Assignee: Hudson Enterprizes, Inc., Hudson, Colo.

[21] Appl. No.: 807,114

[22] Filed: Dec. 19, 1996

[51] Int. Cl.[6] .......... B23P 19/04

[52] U.S. Cl. .......... 29/252; 29/264

[58] Field of Search .......... 29/264, 263, 256, 29/254, 252; 254/93 H, 93 R

[56] References Cited

U.S. PATENT DOCUMENTS

| | | | |
|---|---|---|---|
| 4,920,625 | 5/1990 | Smith | 29/264 |
| 5,233,740 | 8/1993 | Chen | 29/252 |

*Primary Examiner*—Robert C. Watson

[57] ABSTRACT

A tool for the replacement of wheel holding studs in the inner hub of a dual wheel unit, in which the stud is pulled into the hole provided for the stud without requiring removal of the inner hub. The tool includes a piston-cylinder assembly adapted to operate on fluid pressure.

8 Claims, 1 Drawing Sheet

STUD INSTALLER FOR WHEEL STUDS

BACKGROUND AND SUMMARY OF THE INVENTION

This invention pertains to devices for the installation of replacement studs in the inner hub of a dual wheel unit. Such dual wheel units are common on buses, heavier trucks and trailers and are also used on some recreational vehicles such as motor homes and off-road equipment.

Studs extend from the inner wheels and are adapted to receive lug nuts to hold the outer wheels. These lugs occasionally break from fatigue or the like while in use, or may simply break by being pulled up too tight or may have stripped threads. In any case, a broken stud should be promptly replaced.

Replacement of the stud is commonly accomplished by removing the broken stud by driving it out of the hole in the inner hub or pressing it out, and then driving or pressing a new stud into that hole. That procedure is usually satisfactory, but unnecessarily time consuming in that the hub must be removed.

By this present invention, it is possible to accomplish the replacement of the broken stud without requiring the removal of the inner hub and its bearing and seal. The tool is convenient to use in any place where either hydraulic or pneumatic power is available. The tool is relatively small and convenient.

DESCRIPTION

Figure 2:
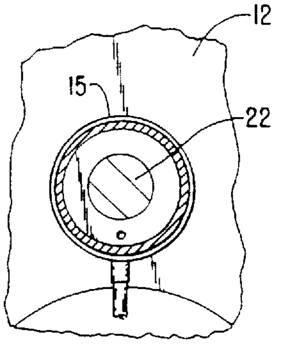
FIG. 2 is a view of the complete tool from line 2—2 of FIG. 1.

Briefly this invention comprises a tool for pulling a stud into its support rather than requiring a press to insert it. The pulling is accomplished as a straight pull—without twisting—so that the stud is installed with the same type of force as if a press were used.

More specifically and with reference to the drawings, the tool is adapted to be used to pull a stud 10 into a hole 11 in the hub 12. The outer wheel is not shown because it is held in place by the studs and is not present when a broken stud is replaced.

The tool includes a guide essentially comprising an outer case 15 which is adapted to abut the surface of the hub 12. A relatively long, internally threaded adaptor 16 is slidably disposed in the case 15. The threads 17 internally of the adaptor are preferably the same fully across the axis, and they must match the external threads 18 of the stud 10 so that there can be a threaded engagement between the adaptor 16 and the stud 10.

At the end of the adaptor 16 opposite its engagement with the stud 10, there is a second threaded engagement between a puller 20 and the internal threads 17 of the adaptor. The puller 20 is simply a bolt-like piece having a knurled head 21, a shank 22, and a threaded end 23. This end 23 is threaded into the adaptor 16.

Although a uniform thread is desirable, it is recognized that foreign trucks may have threads based on the metric system of measurement while domestic trucks may still be based on the system measuring in inches. Therefore it may be necessary to have a plurality of adaptors 16 to fit various studs. These adaptors may have threads different at one end from the other, or may have uniform threads and use differently threaded pullers to match the studs. The only requirement is that both the puller 20 and the stud 10 can be fully engaged by the threads in the adaptor 16.

To provide the pulling force, the preferred device is a simple piston-cylinder arrangement powered either by hydraulic force or pneumatic pressure. In the preferred embodiment, a cylinder housing 25 is adapted to seat on the end of the case 15 opposite the wheel 12. This housing includes a base 26 surrounding the shank 22 of the puller and seated on, or fixed to the case 15. The base provides an entry 27 for the powering fluid. An exterior tube 25 leading to the entry provides an easy connection to introduce the fluid into the cylinder 25.

Figure 1:
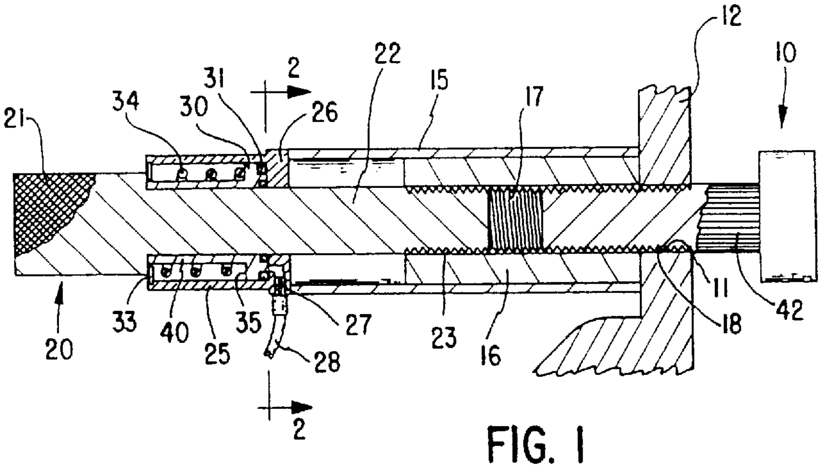
FIG. 1 is a vertical sectional view of this new tool showing a stud about to be pulled into the hub.
Figure 3:
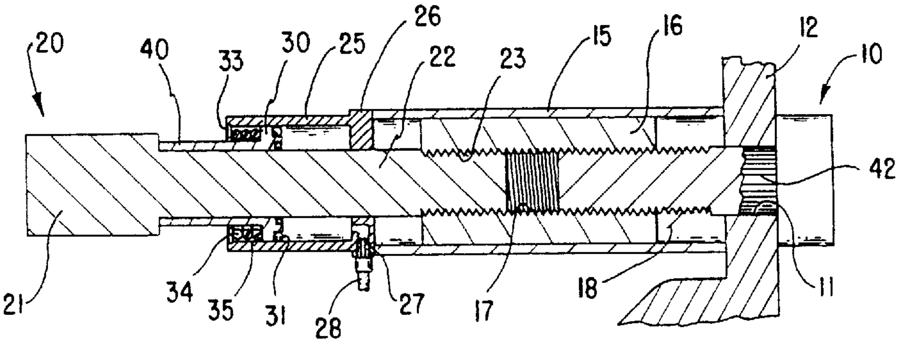
FIG. 3 is a view similar to FIG. 1 with stud fully installed.

The piston 30 is slidably enclosed in the cylinder 25 and also surrounds the shank 22 of the puller. Suitable packing rings 31 may be used to seal the piston from the cylinder walls and from the surface of the shank. The cylinder 25 is formed to provide a stop wall 33 opposite the base 26 adapted to be the wall against which a compression spring 34 presses. The spring 34 also engages an upper surface 35 of the piston. Thus the piston is biased to a closed position (FIG. 1) where the end of the piston 20 is urged against the top of the base 26. It will be obvious that introduction of a fluid through the entry 27 into the cylinder will cause the piston to move to an open position (FIG. 3).

The piston 30 is formed with an extended tubular wall to extending from the piston 30 around the shank 22 of the puller and through the stop wall 33 so that it can engage the shoulder of the head 21. By this form, the movement of the piston 30 to the open position will cause the puller also to move in a direction to pull the stud 10 into the hole 11 in the hub.

The operation of the tool is now obvious. First, after removal of the broken stud, a replacement stud 10 is placed into the hole 11. Because the threads 18 are slightly smaller than the hole, they will ordinarily be readily extended. The ribbed part 42 of the stud will be slightly larger than the hole to provide a tight press fit with the hole, and therefore will not be easily extended.

The adaptor 16 will be threadably engaged with the threads 18 of the stud, and covered with the case 15. The case 15 is normally attached to and carries the piston 25 and its appurtenant parts. The puller can then be placed into its openings in the piston parts and be threaded into the adaptor 16 until the knurled head 21 abuts the extended wall 40 of the piston 30. At that point, fluid—either oil under pressure in a hydraulic system, or compressed air in a pneumatic system—can be introduced into the cylinder 25 through the tube 28 and entry 27. This pressure increases until the resistance of the ribbed part 42 against the walls of the hole 11 is overcome and the stud 10 is pulled into place and thus replaced as it would be by a press. However, this hub 12 is still in place on the vehicle so that the time normally consumed by removal and replacement of the inner hub is saved.

It will be quite apparent that the use of this relatively simple tool will save considerable time and space for truck or trailer repair shops, and for tire shops.

Certain new hubs are currently “throw away” devices in which bearings and seals are not reusable so that the entire assembly must be replaced. The tool, for those hubs, has an even greater economic advantage.

I claim as my invention:

1. A tool for installing studs into a hole in a metal plate such as a truck hub, said tool comprising a guide adapted to engage one surface of said metal plate, connecting means slidable engaging said guide for keeping the movement of said connecting means substantially perpendicular to said surface, puller means for pulling said connecting means slidable within said guide, said connecting means engageable with said stud, said puller means extending in a direction away from said surface, and powered means engaging said puller means for forcing said puller means to pull said connection means within said guide in a direction away from said surface whereby said stud is pulled into said hole in said plate.

2. The tool of claim 1 in which said connecting means is an adaptor having internal threads, said stud being threadably engaged with said threads in said adaptor and said puller is also threadably engaged with said adaptor.

3. The tool of claim 1 in which said power means is operated by fluid power.

4. The tool of claim 3 in which said fluid is hydraulic oil.

5. The tool of claim 3 in which said fluid is compressed air.

6. The tool of claim 2 in which said puller means includes an elongated shank extending through an opening in said power means and is threadably engaged with said adaptor, said puller also having a head, said head being engaged by said power means to provide for the pulling action.

7. The tool of claim 6 in which said power means includes a cylinder having a base engaged with said case, said base including an entry way for introduction of said fluid, said power means also including a piston slidably enclosed in said cylinder and abutting said head of said puller, whereby force generated in said cylinder will be exerted on said case and said head.

8. The tool of claim 7 in which a compression spring is enclosed in said cylinder and engages said piston to bias said piston to a closed position opposite to the position to which fluid pressure would move said piston.

* * * * *